(12) United States Patent
Weh

(10) Patent No.: US 12,479,406 B2
(45) Date of Patent: Nov. 25, 2025

(54) CUBOIDAL HOUSING BLOCK, PARTICULARLY FOR A HYDRAULIC MODULATOR TO GENERATE, CONTROL OR REGULATE A BRAKE PRESSURE IN A BRAKE CIRCUIT OF AN ELECTRONICALLY CONTROLLABLE POWER-BRAKE SYSTEM

(71) Applicant: Robert Bosch GmbH, Stuttgart (DE)

(72) Inventor: Andreas Weh, Sulzberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 454 days.

(21) Appl. No.: 18/051,702

(22) Filed: Nov. 1, 2022

(65) Prior Publication Data

US 2023/0192047 A1 Jun. 22, 2023

(30) Foreign Application Priority Data

Dec. 16, 2021 (DE) ...................... 10 2021 214 555.8

(51) Int. Cl.
*B60T 8/42* (2006.01)
*B60T 8/40* (2006.01)
*B60T 13/66* (2006.01)

(52) U.S. Cl.
CPC .......... *B60T 8/4266* (2013.01); *B60T 8/4081* (2013.01); *B60T 13/662* (2013.01)

(58) Field of Classification Search
CPC .... B60T 8/4266; B60T 13/662; B60T 8/4081; B60T 8/343; B60T 17/02; F04B 53/16; F04B 17/03
See application file for complete search history.

(56) References Cited

U.S. PATENT DOCUMENTS

| | | | | |
|---|---|---|---|---|
| 9,786,176 B2* | 10/2017 | Northrup | ............... | G08G 1/144 |
| 10,780,868 B2* | 9/2020 | Weh | ........................ | B60T 8/368 |
| 2015/0375723 A1* | 12/2015 | Hurst | .................... | F04B 53/001 |
| | | | | 137/565.11 |

FOREIGN PATENT DOCUMENTS

DE 102016202113 A1 8/2017

OTHER PUBLICATIONS

Korean Patent No. KR 20100057889 to Bareiss et al published on Jun. 1, 2010.*
European Patent No. EP 1861298 to Giering et al published on Jul. 14, 2010.*

* cited by examiner

*Primary Examiner* — Pamela Rodriguez
(74) *Attorney, Agent, or Firm* — NORTON ROSE FULBRIGHT US LLP

(57) ABSTRACT

A cuboidal housing block, particularly for a hydraulic modulator to generate, control or regulate a hydraulic pressure in a brake circuit of an electronically controllable power-brake system. Housing blocks have, inter alia, a mounting side which is provided for mounting an electronic control unit. To save on weight and material, a recess is provided on one long side of the housing block, the recess being in the form of a groove that is closed on the sides and otherwise open toward the surroundings of the housing block. The recess is bounded lengthwise by bars, an outer flank of these bars transitioning seamlessly into the mounting side and enlarging its area.

6 Claims, 2 Drawing Sheets

CUBOIDAL HOUSING BLOCK, PARTICULARLY FOR A HYDRAULIC MODULATOR TO GENERATE, CONTROL OR REGULATE A BRAKE PRESSURE IN A BRAKE CIRCUIT OF AN ELECTRONICALLY CONTROLLABLE POWER-BRAKE SYSTEM

CROSS REFERENCE

The present application claims the benefit under 35 U.S.C. § 119 of German Patent Application No. DE 10 2021 214 555.8 filed on Dec. 16, 2021, which is expressly incorporated herein by reference in its entirety.

FIELD

The present invention relates to a cuboidal housing block, particularly for a hydraulic modulator to generate, control or regulate a brake pressure in a brake circuit of an electronically controllable power-brake system.

BACKGROUND INFORMATION

German Patent Application No. DE 10 2016 202 113 A1 describes a cuboidal housing block. FIG. 1a shows a transparent representation of such a housing block, so that a variety of mountings, connections and channel interconnections may be identified, which were formed on the housing block by machining.

The convention housing block includes a total of six outer sides, which face each other in respective pairs in plane-parallel fashion.

Among other things, it has two relatively large outer sides in the surface, which are denoted hereinafter as first and second mounting sides, since they are provided to mount a motor and an electronic control unit, respectively, on the housing block.

A pressure generator disposed on the housing block is driven by the motor according to requirement. To that end, the electronic control unit processes signals which, for example, represent an existing braking command and/or the slip ratios prevailing at the wheels assigned to the wheel brakes, in order to form corresponding control signals for this motor.

Beyond that, mountings are provided on the housing block for valves with which the brake pressure supplied by the pressure generator is wheel-selectively controllable. The valves are likewise controllable electrically by the control unit.

In addition, the housing block has a pair of transverse sides. Each of these transverse sides extends perpendicular to the first mounting side and to the second mounting side. They were produced by splitting an extrudate into extrudate sections, each of the extrudate sections forming one housing block. The extrudate was produced originally in an extrusion process.

Finally, the housing block also has two long sides, each of which is aligned perpendicular to the first mounting surface, to the second mounting surface, to the first transverse side and to the second transverse side. The long sides extend in or counter to an extrusion direction of the extrudate.

Because of an increasing electrification of brake systems, control units are experiencing a growth in size and determine the dimensions of the housing block, its weight as well as the material costs based on the area size of the assigned mounting side.

SUMMMARY

A housing block including features according to the present invention may have the advantage of having less weight and entailing lower material costs than a conventional housing block, accompanied by a mounting surface unchanged in size for the electronic control unit.

This may be achieved according to an example embodiment of the present invention by providing at least one recess on one long side of the housing block, the recess running in or counter to the extrusion direction of the extrudate and being implemented in the form of a groove that is closed on the sides and otherwise open toward the surroundings of the housing block. Such a recess may be produced when producing the extrudate by extrusion and thus entails no additional manufacturing costs. In each case it is bounded on the sides by a continuous bar. On the outer side of the housing block, the outer flank of the bar transitions seamlessly into the remaining part of the mounting side and enlarges its area. Since the mounting side is flat, it is completely available for mounting an electronic control unit. Mountings provided on the housing block for pressure-medium-controlling components and/or channels for the pressure-medium-conducting contacting of these mountings are disposed outside of a cross-sectional area of the bars. Accordingly, these bars are form-stable, so that the recess may be dimensioned commensurately and therefore permits relatively great savings in material and weight.

During assembly of a hydraulic modulator, the bars and the recess between these bars may be used to improve the positioning or to fix the position of the housing block in an assembly device. The bars are suitable for conducting assembly forces to the assembly device, without jeopardizing the stability or the pressure-medium impermeability of the housing block. Specifically, in this regard it is advantageous if the recess is formed or located symmetrically relative to a center axis between the mounting sides of the housing block, because assembly forces occurring then load the individual bars uniformly. In principle, the bars may be implemented with the same or different cross-sections.

Additional advantages or advantageous further developments of the present invention are derived from the following description.

BRIEF DESCRIPTION OF THE DRAWINGS

An exemplary embodiment of the present invention is shown in the figures and explained in detail in the following description.

For this purpose, in the two figures, features corresponding to each other are provided uniformly with the same reference numerals.

DETAILED DESCRIPTION OF EXAMPLE EMBODIMENTS

Figure 1:
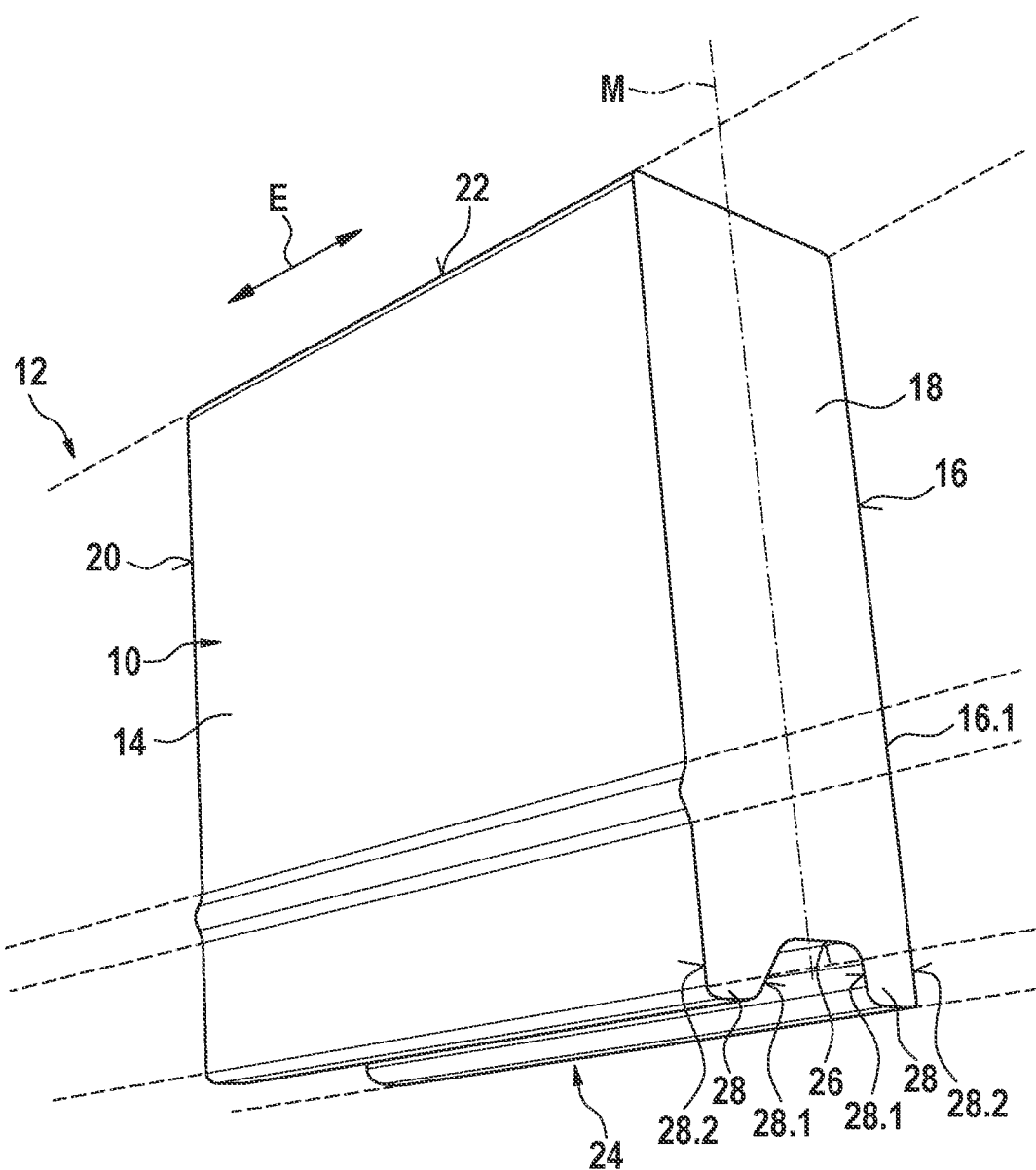
FIG. 1 shows a perspective representation of the housing block prior to its machining, the view being directed obliquely from below toward a first mounting side and a first transverse side of the housing block, according to an example embodiment of the present invention.

For reasons of cost, a housing block (10) shown in FIG. 1 was produced by cutting an extrudate (12) to length into multiple extrudate sections. This cutting to length is accomplished preferably by conventional sawing, each extrudate section yielding one individual housing block (10).

Extrudate (12) was produced previously in a generally conventional extrusion process. During the extrusion, plastically deformable or viscous material, in the present case a metal, preferably an aluminum alloy, is pressed continuously under pressure out of a shaping opening of a die. The extrudate produced in this manner, thus, in the given case, extrudate (12), hardens by cooling upon exiting from the opening. Extrudates with complex cross-sections in any length may be produced exceptionally inexpensively per extrusion.

Housing block (10) shown has a cuboid shape and accordingly has a total of six outer sides. In each case two of these outer sides face each other in plane-parallel fashion. One outer side having a large area may be seen in FIG. 1. It is referred to as a first mounting side (14) of housing block (10), and is provided to mount a motor for driving the pressure generator. In the exemplary embodiment, this first mounting side (14) is subdivided into two sub-areas of different size by a continuous, horizontally running and outwardly projecting bead. The motor is mounted on the upper sub-area which is larger in terms of surface area.

Situated opposite first mounting side (14) is a second mounting side (16) which is provided for mounting the electronic control unit. Of second mounting side (16), only a continuous edge (16.1) at the transition to a first transverse side (18) of housing block (10) is discernible in FIG. 1. Nevertheless, it can be gathered from the straight edge profile that second mounting side (16) is flat, so that the entire area of this second mounting side (16) is therefore available for mounting an electronic control unit.

In addition, FIG. 1 shows a second transverse side (20) of housing block (10). In each case, both transverse sides (18; 20) extend vertically between the two mounting sides (14; 16) and therefore correspond to the sawing areas which were formed when cutting extrudate (12) to length into individual housing blocks (10).

Finally, housing block (10) has two further narrow sides, referred to as long sides (22; 24). They run in or counter to an extrusion direction (E) of extrudate (12). Long sides (22; 24) are aligned perpendicular to first and second mounting sides (14; 16) and perpendicular to first and second transverse sides (18; 20) of housing block (10).

According to the present invention, on second long side (24) located at the bottom according to FIG. 1, a recess (26) is provided which is in the form of a groove that is closed on the sides and otherwise open toward the surroundings of housing block (10).

This recess (26) is formed symmetrically relative to a center axis (M) between the two mounting sides (14; 16) and extends continuously from first transverse side (18) up to second transverse side (20) of housing block (10). At both ends, recess (26) is open toward these transverse sides (18; 20).

Recess (26) is bounded lengthwise by continuous bars (28). Inner flanks (28.1) of these bars (28) are facing recess (26), while outer flanks (28.2) are located on the outer side of housing block (10). Bars (28) shown have identical cross-sections, which is not an imperative requirement for the present invention, however. In the same way, it is optional whether to make the bottom of recess (26) horizontal as shown, or alternatively, to make it convexly or concavely arched or tapered.

Outer flanks (28.2) of bars (28) transition seamlessly into respective mounting sides (14; 16) and enlarge their areas.

Figure 2:
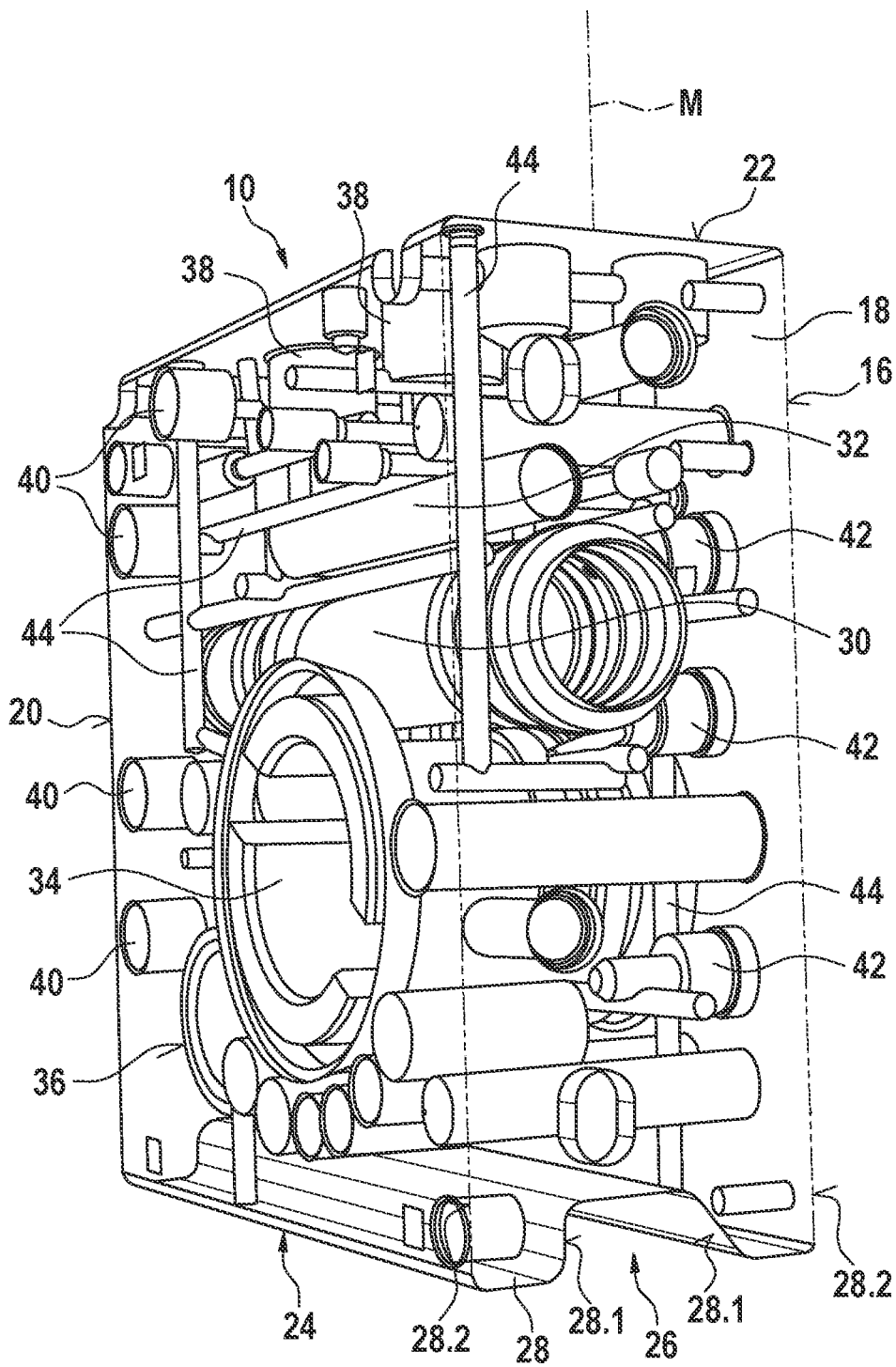
FIG. 2 shows a transparent representation of the housing block according to FIG. 1 after the machining, according to an example embodiment of the present invention.

After cutting extrudate (12) to length, housing block (10) shown in FIG. 1 is subjected to mechanical metal cutting. In the process, blind-hole-type mountings that are open to the outside are introduced into housing block (10). FIG. 2 shows a housing block (10) after the machining. The placement of at least the openings essential for the present invention is discernible from the transparent representation.

Housing block (10) according to FIG. 2 is provided for a hydraulic modulator of an electronically controllable power-brake system. Modern power-brake systems differ from conventional muscular-energy braking systems principally in that the driver is not directly involved in generating the brake pressure, but rather only inputs a braking command. This braking command is detected by sensors and further processed by the electronic control unit to form control signals with which, inter alia, a motor is controlled that drives a pressure generator. The pressure generator thereupon supplies a brake pressure proportional to the braking command.

In contrast to hydraulic modulators of muscular-energy brake systems, hydraulic modulators of power-brake systems are therefore equipped with a braking-command input device. In addition, power-brake systems also have a simulator device which, within the context of a braking-command input, enables actuation of a pedal or a lever with an actuating travel by the driver, and which, as a countermove, supplies to the driver a haptic feedback in the form of an actuating force. The actuating travel represents the braking command and is determined by measurement.

The braking-command input device is accommodated on the housing block, inter alia, in a so-called master-cylinder mounting (30). It starts from first transverse side (18) of housing block (10) and runs horizontally in the direction of opposite second transverse side (20). A travel-sensor mounting (32) for accommodating a sensor system to detect the actuating travel is offset eccentrically and, according to FIG. 2, is formed above this master-cylinder mounting (30) on first transverse side (18). Travel-sensor mounting (32) runs axially parallel to master-cylinder mounting (30) and, like it, ends in the interior of housing block (10).

Running below this master-cylinder mounting (30) and aligned transversely to it is a pressure-generator mounting (34), which is placed approximately in the center of housing block (10). This pressure-generator mounting (34) opens out to first mounting side (14) for the motor and to opposite second mounting side (16) for the electronic control unit and therefore crosses entire housing block (10). Pressure-generator mounting (34) is provided to receive a piston-cylinder unit that includes a cylinder in which a piston is accommodated in a manner allowing axial displacement. To generate braking pressure, the piston is driven by the motor to be mounted on first mounting side (14) of housing block (10).

A simulator mounting (36) is discernible in FIG. 2, which is offset parallel to pressure-generator mounting (34) and is partially concealed by it. This simulator mounting (36) also opens out at first mounting side (14). It extends axially parallel to pressure-generator mounting (34), however ends in the interior of housing block (10) in the manner of a blind hole.

Also provided on housing block (10) are connection openings (38; 40) which are used to connect housing block (10) in pressure-medium-conducting fashion to a reservoir in which pressure medium is stored or to wheel brakes of the braking system. Connection openings (38) for the pressure-medium reservoir empty out to upper first long side (22) of housing block (10) according to FIG. 2, while connection openings (40) for the wheel brakes are placed on first mounting surface (14) intended for the motor.

Second long side (24) of housing block (10) provided with groove-like recess (26) and bars (28) for delimiting this recess (26) on the sides lies opposite first long side (22) having connection openings (38) for the pressure-medium reservoir.

In addition, valve mountings (42) are portrayed on second mounting side (16) of housing block (10) provided for the electronic control unit. Electrically controllable valves are mounted with their hydraulic parts in these valve mountings (42). Valve actuators to be placed on the hydraulic parts of the valves project to the outside relative to second mounting side (16) and after the control unit has been mounted, are enclosed by a control-unit housing (not shown).

Finally, formed in the interior of a housing block are interconnecting channels or boreholes (44) which contact the described mountings and openings (30-42) with one another in pressure-medium-conducting fashion according to a predetermined hydraulic circuit diagram of the power-brake system. These interconnecting channels or boreholes (44) run preferably in three imaginary spatial planes, in each case aligned perpendicular to one another, and thus may be produced without difficulty.

Housing block (10) is populated with the described pressure-medium-conducting and pressure-medium-controlling components subsequent to its machining. With the mounting of the motor and the electronic control unit on respective assigned mounting sides (14; 16), the assembly operation of the hydraulic modulator is complete.

The placement of the components on housing block (10) described makes it possible to position the pressure-medium-conducting interconnecting channels, openings and mountings (30-42) outside of the cross-sectional areas of bars (28) for delimiting recess (26) on the sides. These bars (28) may thus be form-stable and at most, have boreholes which are unavoidable for reasons of manufacturing technology or are used to mechanically anchor the motor or electronic control unit on their assigned mounting sides (14; 16). They are mechanical boreholes which conduct no pressure medium and thus represent no danger for the pressure-medium impermeability of the hydraulic modulator. A wall thickness of such boreholes may turn out to be less relative to the wall thicknesses of pressure-medium-conducting boreholes or mountings.

Naturally, modifications of or additions to the exemplary embodiment described are feasible without departing from the scope of protection of the present invention.

In this regard, it should be pointed out that only one recess (26) is provided on second long side (24) of housing block (10) in the exemplary embodiment described. However, it would be imaginable to form multiple such recesses on just this second long side (24). If a number of these formations were provided, they would be disposed side-by-side and run axially parallel to one another. If necessary, recesses (26) provided could be formed differently in cross-sectional shape and/or cross-sectional area.

What is claimed is:

1. A cuboidal housing block for a hydraulic modulator to generate or control or regulate a brake pressure in a brake circuit of an electronically controllable power-brake system, comprising:
   a first mounting side provided to mount a motor for driving a pressure generator;
   a second mounting side, situated opposite the first mounting side in plane-parallel fashion, provided to mount an electronic control unit able to be anchored on the housing block;
   a first transverse side, and a second transverse side situated opposite the first transverse side in plane-parallel fashion, each of the first transverse side and the second transverse side extends perpendicular to the first mounting side and to the second mounting side; and
   a first long side, and a second long side situated opposite the first long side in plane-parallel fashion,
   each of the first and second long sides being aligned perpendicular to the first mounting side and to the second mounting side as well as perpendicular to the first transverse side and to the second transverse side;
   wherein on one of the first and second long sides, the housing block has at least one recess which passes through from the first transverse side up to the second transverse side of the housing block and which is implemented in the form of a groove that is closed lengthwise and otherwise is open toward surroundings of the housing block,
   wherein the recess is disposed symmetrically relative to a center axis of the housing block running between the first and second mounting sides and extends continuously from the first transverse side to the second transverse side.

2. The cuboidal housing block as recited in claim 1, wherein the recess is bounded lengthwise by a continuous bar, and the bar has an outer flank which transitions seamlessly into one of the first and second mounting sides of the housing block and enlarges an area of the one of the first and second mounting sides.

3. The cuboidal housing block as recited in claim 1, wherein at least the second mounting side of the housing block is implemented as a flat surface.

4. The cuboidal housing block as recited in claim 1, wherein at least one connection opening is formed on the first long side, via which the housing block is contactable with a reservoir for pressure medium, and wherein the recess is formed on the second long side of the housing block opposite the first long side.

5. The cuboidal housing block as recited in claim 1, wherein mountings for pressure-medium-controlling components and/or channels for the pressure-medium-controlling components of the mountings are formed on the housing block and the mountings and channels are disposed outside of a cross-sectional area of a bar.

6. The cuboidal housing block as recited in claim 1, wherein the housing block is an extrudate section separated from an extrudate, the extrudate having an extrusion direction and the first and second long sides of the housing block and the recess extending in or counter to the extrusion direction.

* * * * *